United States Patent
Hagen et al.

(10) Patent No.: US 10,090,528 B2
(45) Date of Patent: Oct. 2, 2018

(54) CATHODE UNIT FOR AN ALKALINE METAL/SULFUR BATTERY HAVING AN OPTIMISED ARRESTER STRUCTURE

(75) Inventors: Markus Hagen, Kronau (DE); Holger Althues, Dresden (DE); Stefan Kaskel, Dresden (DE); Thomas Berger, Pfinztal (DE); Susanne Dörfler, Dresden (DE)

(73) Assignee: FRAUNHOFER-GESELLSCHAFT ZUR FORDERUNG DER ANGEWANDTEN FORSCHUNG E.V. (DE)

( * ) Notice: Subject to any disclaimer, the term of this patent is extended or adjusted under 35 U.S.C. 154(b) by 546 days.

(21) Appl. No.: 14/127,241

(22) PCT Filed: Jun. 19, 2012

(86) PCT No.: PCT/EP2012/061687
§ 371 (c)(1),
(2), (4) Date: Mar. 12, 2014

(87) PCT Pub. No.: WO2012/175486
PCT Pub. Date: Dec. 27, 2012

(65) Prior Publication Data
US 2014/0234723 A1    Aug. 21, 2014

(30) Foreign Application Priority Data
Jun. 21, 2011    (DE) .................... 10 2011 077 932

(51) Int. Cl.
*H01M 4/66* (2006.01)
*H01M 4/38* (2006.01)
(Continued)

(52) U.S. Cl.
CPC ........ *H01M 4/663* (2013.01); *H01M 4/0404* (2013.01); *H01M 4/13* (2013.01);
(Continued)

(58) Field of Classification Search
CPC ......................... H01M 4/663; H01M 4/474
See application file for complete search history.

(56) References Cited

U.S. PATENT DOCUMENTS

| 3,883,367 A | 5/1975 | Chiku et al. |
| 4,929,521 A * | 5/1990 | Cipriano ............ H01M 4/13 |
| | | 429/102 |

(Continued)

FOREIGN PATENT DOCUMENTS

| DE | 102010030887 A1 | 1/2012 |
| EP | 1391948 A1 | 2/2004 |

(Continued)

OTHER PUBLICATIONS

Japanese Office Action dated Dec. 17, 2015.
(Continued)

*Primary Examiner* — Stewart A Fraser
*Assistant Examiner* — Rachel L Zhang
(74) *Attorney, Agent, or Firm* — Tarolli, Sundheim, Covell & Tummino LLP

(57) ABSTRACT

The invention relates to a cathode unit for an alkaline metal/sulphur battery, containing a cathode arrester, which comprises a carbon substrate, and an electrochemically active component, which is selected from sulphur or an alkaline metal sulphide and is in electrically conductive contact with the carbon substrate.

12 Claims, 2 Drawing Sheets

(51) Int. Cl.
  *H01M 4/58* (2010.01)
  *H01M 4/80* (2006.01)
  *H01M 10/052* (2010.01)
  *H01M 10/054* (2010.01)
  *H01M 4/04* (2006.01)
  *H01M 4/13* (2010.01)
  *H01M 4/139* (2010.01)
  *H01M 4/62* (2006.01)
  *H01M 4/74* (2006.01)

(52) U.S. Cl.
  CPC ............ *H01M 4/139* (2013.01); *H01M 4/38* (2013.01); *H01M 4/5815* (2013.01); *H01M 4/625* (2013.01); *H01M 4/667* (2013.01); *H01M 4/747* (2013.01); *H01M 4/80* (2013.01); *H01M 4/806* (2013.01); *H01M 10/052* (2013.01); *H01M 10/054* (2013.01)

(56) References Cited

U.S. PATENT DOCUMENTS

| | | | |
|---|---|---|---|
| 5,472,805 A | 12/1995 | Briggs et al. | |
| 6,403,263 B1 | 6/2002 | Roach | |
| 2002/0106561 A1 | 8/2002 | Lee et al. | |
| 2010/0178543 A1* | 7/2010 | Gruner | B82Y 30/00 429/121 |
| 2011/0165466 A1* | 7/2011 | Zhamu | B82Y 30/00 429/231.8 |
| 2012/0251889 A1* | 10/2012 | Janssen | H01B 1/122 429/231.8 |

FOREIGN PATENT DOCUMENTS

| | | |
|---|---|---|
| EP | 1427039 A2 | 6/2004 |
| EP | 2081244 A1 | 7/2009 |
| EP | 2339674 A1 | 6/2011 |
| JP | S49-61627 A | 6/1974 |
| JP | 2002352796 A | 12/2002 |
| JP | 2003518713 A | 6/2003 |
| JP | 2004119367 A | 4/2004 |
| JP | 2002203542 A | 7/2007 |
| JP | 2007-265852 A | 10/2007 |
| JP | 2009170410 A | 7/2009 |
| JP | 2012-238448 A | 12/2012 |
| WO | 0147088 A2 | 6/2001 |
| WO | 2012001152 A1 | 1/2012 |

OTHER PUBLICATIONS

European Office Action dated Dec. 17, 2014.
German Office Action dated Feb. 27, 2012.
Pappas, Christian, et al. "Fortgeschrittenen Praktikum Quantenhall-Effekt", Universitat Stuttgart, Jul. 24, 2007, retrieved from "http://michi.is-a-geek.org/stadium/Scripte/Fortgeschrittenen%20Praktikum/7%20-%20Quantenhalleffekt/main.pdf", Aug. 2, 2012.
European Office Action dated Apr. 17, 2015.
Office Action for Japanese Application No. 2014-516303, dated Jul. 29, 2016.

* cited by examiner

CATHODE UNIT FOR AN ALKALINE METAL/SULFUR BATTERY HAVING AN OPTIMISED ARRESTER STRUCTURE

The present invention relates to a cathode unit for an alkali metal-sulfur battery and to a process for production thereof.

As well as the electrodes comprising the electrochemically active components, batteries also comprise current collectors in order to collect the electron flow, lead it away and make it usable for the user. Current collectors should have, among other properties, a low weight to achieve maximum energy densities and ensure good electrical contact to the respective electrochemically active components.

Collector materials for battery electrodes typically consist of metals such as aluminum, copper and nickel, and have typical thicknesses between 9 and 30 µm.

Conventional electrodes are produced via paste processes, wherein a binder is dissolved in a solvent and then dispersed together with conductive carbon black and the electrochemically active material. The paste obtained is then applied (for example by bar coating or extruding) to a metal foil which functions as the current collector, and is then dried and calendered.

Metallic current collectors have a relatively high weight, which has an adverse effect on the energy densities achievable. Moreover, metallic current collectors are relatively expensive and, in long-term operation, corrosion can result in failure of the battery.

Figure 1:
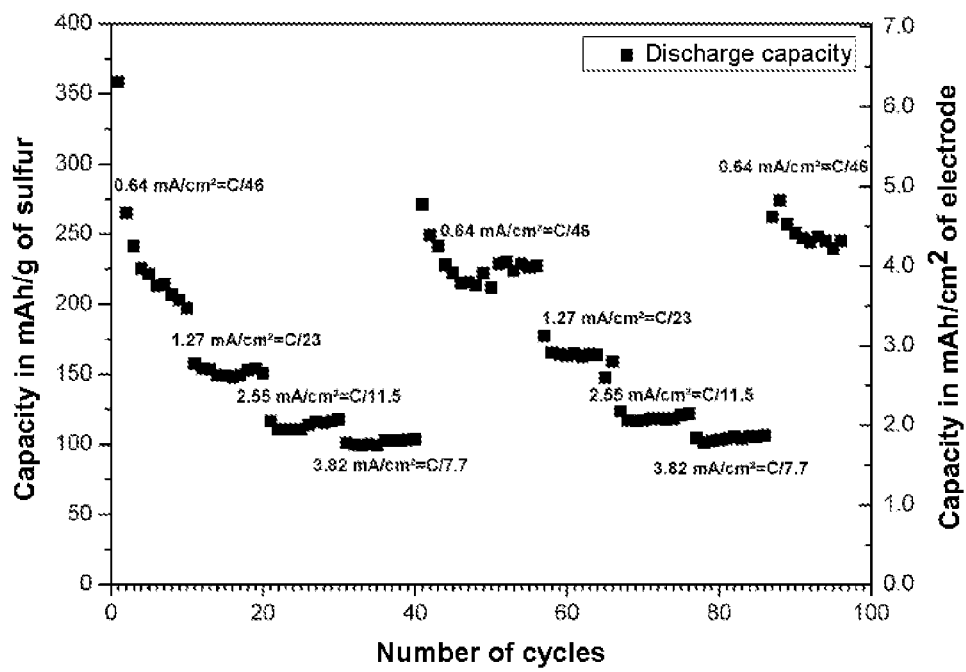
FIG. 1 illustrates a plot showing the capacity as a function of the number of cycles.

Alkali metal-sulfur batteries are battery systems with which high energy densities can be achieved. For instance, sulfur as a cathode material against lithium has theoretical capacities of 1672 mAh/g, which are more than five times as high as the theoretical capacities in lithium ion cathodes (150-280 mAh/g). The increase in the energy density and in the cycling stability of alkali metal-sulfur batteries are the essential emphases of development for further improvement of this battery type and establishment thereof as a future energy storage means.

It is an object of the present invention to provide an alkali metal-sulfur battery with which a high energy density can be achieved, which has good long-term stability and can preferably be produced in a very efficient and inexpensive process.

In a first aspect of the present invention, the object is achieved by a cathode unit for an alkali metal-sulfur battery, comprising:
 a cathode collector comprising a carbon substrate,
 an electrochemically active component which is selected from sulfur and an alkali metal sulfide and is in electrically conductive contact with the carbon substrate.

In the context of the present invention, it has been realized that the use of a carbon substrate as a collector material in a cathode unit allows an alkali metal-sulfur battery of high energy density to be achieved. It is also possible to produce such a cathode unit in a simple and efficient manner.

The use of a carbon substrate enables metallic components, for example metal foils, to be dispensed with in the cathode collector. This weight saving allows further improvement in the energy density of an alkali metal-sulfur battery.

In a preferred embodiment, the cathode collector of the cathode unit therefore does not contain any metallic substrate, and more particularly no flat metallic structure, for example metal foils, as otherwise used in standard cathode collectors.

In the context of the present invention, the term "cathode collector" is understood in its customary meaning familiar to the person skilled in the art, and refers to the component of a battery which is in conductive contact with the electrochemically active material of the cathode and brings about the output of current from and input of current to the active component of the electrode. A collector of an electrode is also referred to as a "current acceptor" (e.g. cathode current acceptor).

The carbon substrate is preferably configured as a flat structure. This may preferably be a self-supporting flat structure. The term "self-supporting" means that the flat structure, through appropriate interaction of the components thereof which are to be described in more detail below (for example the carbon fibers, carbon particles, carbon nanotubes, etc.) with one another, even without application to a carrier substrate, has a defined shape and a sufficient dimensional stability. The self-supporting flat structure can thus be used without a carrier substrate. Alternatively, the self-supporting flat structure can also additionally be fixed on a carrier substrate.

The (self-supporting or non-self-supporting) carbon substrate may also be applied to a carrier substrate for better fixing thereof. This carrier substrate may, for example, be a polymer material or a nonwoven. It is also possible to mount the carbon substrate of the cathode collector on the battery separator.

In order to further improve the conductivity of the carbon substrate if necessary, it may also be applied to a metallic structure, for example a metal grid as a carrier substrate.

The selection of suitable carbon materials for the carbon substrate has to be made such that a sufficiently high conductivity of this carbon substrate and hence also of the cathode collector is still assured.

Preferably, the carbon substrate has a surface conductivity of at least 0.01 S, more preferably of at least 1 S, even more preferably of at least 100 S. The surface conductivity can be determined by the four-point method. Alternatively, metal contacts can be formed on two opposite edges of a fabric in rectangular format, and a resistivity measurement can be conducted over the fabric.

Preferably, the carbon substrate has a carbon content of at least 70% by weight, more preferably at least 80% by weight, even more preferably at least 90% by weight. In a preferred embodiment, the cathode collector may even consist exclusively of carbon.

Suitable carbon materials with which electrical conductivity sufficient for a collector structure can be achieved are known in principle to the person skilled in the art. In the context of the present invention, the carbon material of the carbon substrate may be selected, for example, from carbon fibers, graphite (for example in the form of particles or flakes), carbon nanotubes, porous carbon (e.g. activated carbon), graphene (for example in the form of graphene flakes), carbon black, or mixtures thereof.

As well as differing in their solid structures (e.g. graphite, graphene, amorphous solids, etc.), these carbon materials may also differ in their morphology (e.g. particulate, fibrous, etc.) or their porosity.

Preferably, these carbon materials are present in maximum purity. In a preferred embodiment, the carbon materials of the carbon substrate do not comprise any further elements and/or any functional groups.

The carbon substrate of the cathode collector may be manufactured from these carbon materials.

In a preferred embodiment, the carbon substrate may be a woven or nonwoven textile fabric.

Preferred textile fabrics may be selected, for example, from a carbon fiber felt, a woven carbon fiber fabric, a carbon gas diffusion layer, and combinations thereof. Such textile carbon fabrics are known to those skilled in the art and are commercially available.

Carbon felt is a textile material consisting of more or less randomly oriented and interloped carbon fibers. Such materials are known to those skilled in the art and are commercially available.

The specific surface area of the carbon fibers of the carbon felt can be varied over a wide range. The carbon fibers may have, for example, a very high specific surface area (for example at least 1000 $m^2/g$ or even at least 2000 $m^2/g$). Such high specific surface areas can be achieved, for example, by porous fibers. Within the context of the present invention, however, nonporous carbon fibers having distinctly lower specific surface area (e.g. compact, nonporous, graphitic fibers) are also usable.

The carbon fibers of the carbon felt may have, for example, a thickness between 50 μm and 5 mm and/or a weight less than 20 $mg/cm^2$. The carbon fiber felt may also have been surface-treated.

Woven carbon fiber fabrics are known to those skilled in the art and are commercially available or producible by standard processes known to those skilled in the art.

The specific surface area of the carbon fibers of the woven carbon fiber fabric can be varied over a wide range. The carbon fibers may have, for example, a high specific surface area (for example at least 1000 $m^2/g$ or even at least 2000 $m^2/g$). Such high specific surface areas can be achieved, for example, by porous fibers. Within the context of the present invention, however, nonporous carbon fibers having distinctly lower specific surface area (for example compact, nonporous, graphitic fibers) are also usable.

The carbon fibers of the woven carbon fiber fabric may have, for example, a thickness between 50 μm and 2 mm and/or a weight less than 20 $mg/cm^2$. The carbon fibers of the woven carbon fiber fabric may also have been surface-treated.

Carbon gas diffusion layers are porous layers having a thickness typically between 50 μm and 500 μm. The structure of the carbon gas diffusion layers is similar to that of the carbon fiber felts, except that the layer thickness is lower and more defined.

In a further preferred embodiment, the carbon substrate may comprise a braid or network of carbon nanotubes.

Such a braid or network of carbon nanotubes can be produced by spraying or bar-coating processes from dispersions or pastes. As is still to be explained hereinafter, self-supporting carbon nanotube braids or networks can be obtained in the form of a "buckypaper" by a filtration process from dispersion.

In a further preferred embodiment, the carbon substrate is in the form of a carbon foil or of a carbon film.

Preferred materials for the carbon foil or the carbon film are, for example, graphite, carbon black, graphene, activated carbon, carbon nanotubes, or mixtures of these materials.

Foils or films made from the abovementioned carbon materials are known to those skilled in the art and are commercially available or producible by familiar processes.

By way of example, mention may be made at this point of graphite foils or what is called "buckypaper".

Buckypaper is an extremely thin film of aggregated, interwoven carbon nanotubes. Such self-supporting carbon nanotube braids are obtained by a filtration process from dispersion.

Graphite foils are known to those skilled in the art and are commercially available or producible by standard processes known to those skilled in the art. For example, graphite foils can be produced from expanded natural graphite flakes, which are bound to one another in a purely mechanical manner in a calendering process.

In general, the thickness of the carbon substrate may be varied over a wide range depending on the carbon material used. The thickness of the carbon substrate may, for example, be in the range from 50 μm to 5 mm.

The cathode collector may consist exclusively of the carbon substrate.

Alternatively, the cathode collector may additionally have further components.

In a specific embodiment, a substrate layer may have been applied to the carbon substrate. Optionally, a conductive additive may also be added to the substrate layer.

As will be explained in more detail below, this substrate layer may be a catalyst layer. In a preferred embodiment, the catalyst layer comprises a cocatalyst layer on which at least one transition metal is present, for example in the form of a transition metal layer or in the form of transition metal particles. The cocatalyst layer may, for example, be an oxide layer, a nitride layer or oxynitride layer. Suitable materials for the cocatalyst layer may include aluminum oxide, silicon dioxide, magnesium oxide, titanium nitride or silicon nitride. Suitable transition metals may include Fe, Ni, Mo, Co, Cr, Mn or alloys thereof. As will be explained more specifically below, this catalyst layer, in a preferred production process for the inventive cathode unit, may catalyze the conversion of a carbon-containing precursor compound to carbon nanotubes. The catalyst layer preferably has a thickness in the range from 5 nm to 100 nm, more preferably from 20 nm to 50 nm.

In a further preferred embodiment, the substrate layer is a polymer layer (for example an adhesive layer). By means of this polymer layer, it is possible, for example, to fix carbon nanotubes on the cathode collector. The polymer layer preferably has a thickness in the range from 0.01 μm to 30 μm, more preferably from 1 μm to 10 μm.

Instead of a substrate layer, particulate components may alternatively be present on the carbon substrate of the cathode collector. In a specific embodiment, these may be catalyst particles. As already mentioned above, the catalyst may catalyze the conversion of a carbon-containing precursor compound, for example ethene, to carbon nanotubes. For suitable transition metals, reference may be made to the remarks above.

As explained above, the inventive cathode unit also comprises an electrochemically active component which is selected from sulfur and an alkali metal sulfide and is in electrically conductive contact with the carbon substrate.

The alkali metal sulfide is preferably selected from a lithium sulfide and a sodium sulfide.

It is thus preferable that the inventive cathode unit is used in a lithium-sulfur battery or a sodium-sulfur battery.

The sulfur is preferably present as an electrochemically active component in an amount of 0.5 mg to 30 mg per $cm^2$ of cathode collector.

If an alkali metal sulfide is used as the electrochemically active component, it is preferably lithium sulfide or sodium sulfide.

Preferably, the alkali metal sulfide as the electrochemically active component is present in an amount of 0.5 mg to 20 $mg/cm^2$ of cathode collector.

The electrically conductive contact between the electrochemically active component and the carbon substrate can be ensured by virtue of the electrochemically active component at least partly covering the surface of the cathode collector (i.e. the surface of the carbon substrate or of the optional substrate layer). In this case, there thus exists a common interface between electrochemically active component and cathode collector. In the context of the present invention, however, it is also possible that the electrically conductive contact between the electrochemically active component and the carbon substrate is mediated by an electrochemically inactive but electrically conductive component.

In a preferred embodiment, the cathode unit additionally comprises an electrochemically inactive, electrically conductive carbon component which is in electrically conductive contact with the carbon substrate, the electrochemically active component at least partly covering the surface of the electrochemically inactive, electrically conductive carbon component. It may be preferable that the electrochemically inactive, electrically conductive carbon component has been applied at least partly to the surface of the cathode collector (i.e. to the carbon substrate or the optional substrate layer).

Such electrochemically inactive, electrically conductive carbon components are known in principle to those skilled in the art.

In a preferred embodiment, the electrochemically inactive, electrically conductive carbon component is selected from carbon nanotubes, graphite, carbon black, graphene, porous carbons such as activated carbon, and mixtures thereof.

As will be described in more detail below, the application of the electrochemically inactive, electrically conductive carbon component, and also the application of the electrochemically active component, can be effected by processes known to those skilled in the art.

Depending on the material type used, the amount of electrochemically inactive, electrically conductive carbon component can be varied over a wide range. The electrochemically inactive, electrically conductive carbon component may be present, for example, in an amount of 0.1 mg to 2 mg per $cm^2$ of cathode collector.

If the electrochemically inactive, electrically conductive component comprises carbon nanotubes, these are preferably applied to the cathode collector via a chemical gas phase deposition process. The effect of this production process is that the carbon nanotubes are anchored or fixed by one of their ends in the surface of the cathode collector.

In a preferred embodiment, the cathode unit therefore comprises carbon nanotubes as the electrochemically inactive, electrically conductive carbon component, the carbon nanotubes being at least partly anchored or fixed by one of their ends in the surface of the cathode collector.

The length of the carbon nanotubes may vary over a wide range. A suitable length which may be mentioned in this context is, for example, a range from 5 μm to 1000 μm.

The diameter of the nanotubes may, for example, be in the range of 0.1-100 nm, more preferably 1-50 nm, especially preferably 5-20 nm.

Preferably, the carbon nanotubes are present in an amount of 0.1 mg to 100 mg, more preferably of 0.5 mg to 20 mg, even more preferably of 0.5 mg to 5 mg per $cm^2$ of cathode collector.

In a further aspect of the present invention, an alkali metal-sulfur battery comprising the above-described cathode unit is provided.

It is preferably a lithium-sulfur battery or a sodium-sulfur battery.

Preferably, the anode comprises one or more of the following components: metallic lithium, metallic sodium, graphite, alloys of silicon or tin, composites, for example silicon with carbon, tin with carbon, hard carbons.

If the cathode unit comprises sulfur as the electrochemically active component, the anode in a preferred embodiment may comprise metallic lithium or metallic sodium. Alternatively, the anode may comprise lithiated graphite or Li alloys composed of, for example, silicon or tin or composites . . . .

If the cathode unit comprises an alkali metal sulfide, for example lithium sulfide or sodium sulfide, as the electrochemically active component, the anode in a preferred embodiment may comprise graphite, materials which can form alloys with Li and Na, for example silicon or tin, composites, for example silicon with carbon, tin with carbon, hard carbons.

In a further aspect of the present invention, a process for producing the above-described cathode unit is provided, comprising:
  providing a cathode collector comprising a carbon substrate,
  adding an electrochemically active component selected from sulfur and an alkali metal sulfide, such that the electrochemically active component is in electrically conductive contact with the carbon substrate.

With regard to the properties of the carbon substrate and of the electrochemically active component, reference is made to the above remarks.

In a preferred embodiment, an electrochemically inactive, electrically conductive carbon component is additionally added, such that this carbon component is in electrically conductive contact with the carbon substrate. It may be preferable that this electrochemically inactive, electrically conductive carbon component is applied to the surface of the cathode collector (i.e. to the carbon substrate or the optional substrate layer).

With regard to the properties of the electrochemically inactive, electrically conductive carbon component, reference is made to the above remarks.

The application of the electrochemically inactive, electrically conductive carbon component may precede the addition of the electrochemically active component. The provision of the cathode collector is thus followed first by the application of the electrochemically inactive, electrically conductive carbon component (for example of the carbon nanotubes) and, in a further step, the electrochemically active component is applied, such that the electrochemically active component at least partly covers the surface of the electrochemically inactive, electrically conductive carbon component.

Alternatively, the time of application of the electrochemically inactive, electrically conductive carbon component may also overlap with that of addition of the electrochemically active component. In addition, it is also possible in the context of the present invention that the electrochemically inactive, electrically conductive carbon component and the electrochemically active component are applied together.

The electrochemically inactive, electrically conductive carbon component can also be applied via standard processes known to those skilled in the art. For example, the electrochemically inactive, electrically conductive carbon component can be introduced into the cathode unit or applied to the surface of the cathode collector by a chemical gas phase deposition (CVD, "chemical vapor deposition"), a physical gas phase deposition (PVD, "physical vapor deposition"), in the form of a paste (for example carbon component and binders such as PVdF, PVdF-co-HFP or PAN in paste form), by spraying or dipping processes from liquid dispersion, or else by application of a carbon precursor compound (for example organic compound or polymer) and subsequent carbonization and activation.

In a specific embodiment, the step of provision of the cathode collector may also comprise the application of a substrate layer, for example of a catalyst layer or polymer layer, to the carbon substrate. Alternatively, instead of a catalyst layer, catalyst particles can also be applied directly to the carbon substrate. If a polymer layer is applied as the substrate layer, this is preferably an adhesive layer.

If the substrate layer is a catalyst layer comprising an inorganic cocatalyst layer, for example an oxide, nitride or oxynitride layer, this can be applied, for example, via a sol-gel process, a CVD process (i.e. chemical gas phase deposition) or a PVD process (physical gas phase deposition).

If carbon nanotubes are applied as the electrochemically inactive, electrically conductive carbon component, this is preferably done by producing the carbon nanotubes on the surface of the cathode collector, for example by means of a chemical gas phase deposition process (CVD). The use of the surface of the cathode collector (i.e. either of the surface of the carbon substrate or of the surface of the substrate layer, for example of the catalyst layer) as the reaction and deposition surface achieves the effect that the nanotubes are fixed or anchored by one of their ends on this collector surface.

Alternatively, it is also possible in the context of the present invention to produce the carbon nanotubes at first on an external layer, (i.e. a layer not being present in the inventive cathode unit), for example on a layer corresponding to the above-described catalyst layer, and then to transfer these nanotubes to a second layer (referred to hereinafter as transfer layer) and to fix them thereon. This transfer layer may be the substrate layer already applied to the carbon substrate (for example in the form of the polymer layer, preferably of the adhesive layer). Alternatively, it is possible to transfer the carbon nanotubes to the transfer layer and then to apply the transfer layer with the carbon nanotubes fixed thereon to the carbon substrate. An example of a suitable transfer layer is a polymer layer (for example an adhesive layer).

The electrochemically active component can be deposited via standard processes on the surface of the cathode collector and/or of the electrochemically inactive, electrically conductive carbon component.

The application of sulfur to the carbon nanotubes can be effected, for example, via sulfur powder, which is subsequently melted, liquid heated sulfur sublimation, or sulfur dissolved in a solvent.

If an alkali metal sulfide such as lithium sulfide or sodium sulfide is to be applied as the electrochemically active component to the surface of the cathode collector and/or of the electrochemically inactive, electrically conductive carbon component, this can be accomplished in a preferred embodiment by first applying sulfur to the surface and then reacting it with a reactive alkali metal compound, preferably an organometallic alkali metal compound, for example n-butyllithium or n-butylsodium, to give an alkali metal sulfide. With regard to the application of the sulfur, reference may be made to the above remarks. The contacting of the sulfur and of the reactive alkali metal compound can be effected by supplying the reactive alkali metal compound likewise via a solvent and bringing about the conversion to the alkali metal sulfide at elevated temperature. Alternatively, the alkali metal sulfide can also be dissolved in a solvent (e.g. ethanol) and applied to the heated carbon substrate or optionally the heated substrate layer. Alternatively, the alkali metal sulfide can also be melted at high temperatures onto the carbon substrate or optionally the substrate layer.

The cathode unit obtainable by the above-described process can be combined with a suitable anode in order thus to provide an alkali metal-sulfur battery. With regard to suitable anodes, reference may be made to the remarks made above.

As already noted above, through the use of a carbon substrate as a collector material in a cathode unit, it is possible to achieve an alkali metal-sulfur battery of high energy density. The use of a carbon substrate makes it possible to dispense with metallic substrates, for example metal foils, in the cathode collector. In addition, the carbon substrate may itself be used as a reaction surface for the electrochemical reaction, and thus functions in parallel as a collector and electrode. This saving of weight makes it possible to further improve the energy density of an alkali metal-sulfur battery.

In addition, there is better and easier applicability of electrochemically inactive, electrically conductive carbon materials, for example carbon nanotubes, as additional components which further improve the energy density to carbon substrates compared to metal substrates.

Furthermore, a carbon substrate eases the manufacture, since it is thermally more stable than Al. Therefore, it is also possible to more easily apply additional carbon components, for example carbon nanotubes, via CVD. In addition, a self-supporting carbon substrate is more flexible than a metal foil. It is thus easier to produce wound cells. Furthermore, carbon nanotubes or comparable additional carbon components which have been applied to a metal foil can be moved easily by mechanical contact. A flexible self-supporting carbon substrate is much more durable here.

The examples which follow illustrate the invention in detail.

EXAMPLES

Example 1

In example 1, a lithium-sulfur cell was produced, in which a commercially available woven carbon fabric having a very high reaction surface area of about 2000 $m^2/g$ and a weight of about 13 $mg/cm^2$ was used as the carbon substrate. 13.8 mg of sulfur powder were melted on to the woven carbon fabric of size 0.785 $cm^2$. The electrolyte used was 0.7M LiTFSI in DME:DIOX (2:1, v:v) with $LiNO_3$ additive. The cell was cycled between 1.0 and 3.0 V against lithium metal at different current densities. The surface capacities achieved, according to the current density, are 2.0-5.0 mAh/$cm^2$. In comparison, lithium ion or lithium-sulfur cells produced conventionally via paste processes achieve only 0.5-3.0 mAh/cm² at corresponding current densities.

FIG. 1 shows the capacity as a function of the number of cycles.

If a commercially available woven carbon fabric having a surface area which is unspecified by the manufacturer but is much lower is coated with carbon nanotubes and, as described above, a lithium-sulfur cell having 6.6 mg of sulfur and 1.76 mg of CNT on a 0.785 cm² electrode is produced, it is possible to achieve high sulfur exploitation (>50%) and high surface capacities around 6.0 mAh/cm² at a current density of 0.64 mA/cm².

Figure 2:
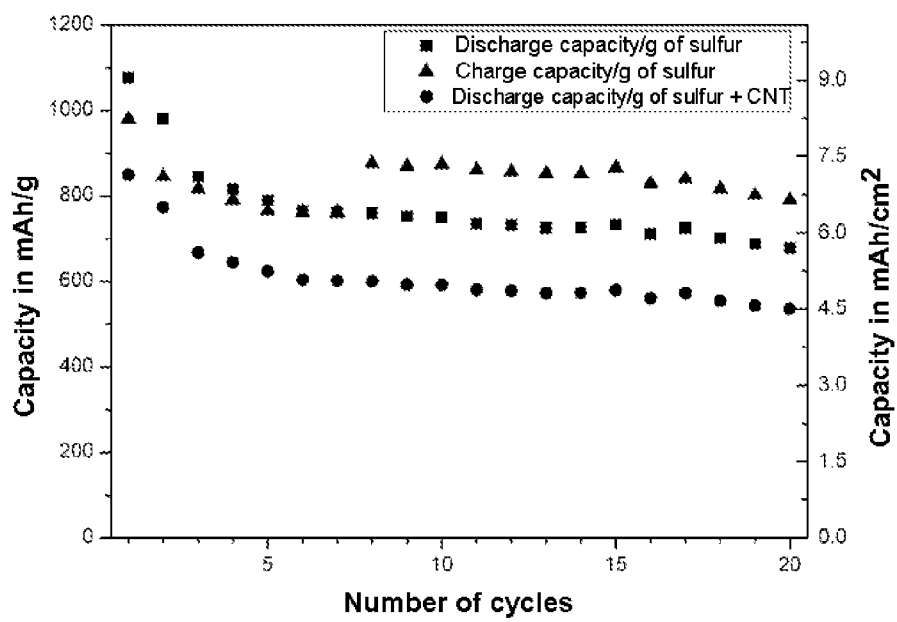
FIG. 2 illustrates a plot showing the capacity as a function of the number of cycles.

FIG. 2 shows the capacity as a function of the number of cycles.

The results demonstrate that good electrochemical results can be achieved for an alkali metal-sulfur battery when a carbon substrate is used as the cathode collector (FIG. 1). A further improvement arises when suitable electrochemically inactive, electrically conductive carbon components, for example carbon nanotubes, are additionally applied to the carbon substrate which functions as a cathode collector (FIG. 2).

Example 2

In example 2, a lithium-sulfur cell was produced, in which a commercially available carbon felt (weight: 3 mg/cm²) functions as the carbon substrate of the cathode collector, and carbon nanotubes are applied to this carbon felt. In addition, the cathode unit of the lithium-sulfur battery comprises sulfur as the electrochemically active component. The sulfur covers at least part of the surface of the carbon nanotubes. 14.8 mg of sulfur were melted onto the felt electrode (A=1.13 cm²) with 1.7 g of carbon nanotubes. The electrolyte used was 1M LiTFSI in DME:DIOX (2:1, v:v) with LiNO₃ additive. The cell was cycled at 1 mA (corresponding to current density of 0.88 mA/cm² and a C rate of C/25) against lithium metal between 1.0 and 3.0 V. The sulfur cathode was between two lithium metal foils and contacts were formed from the side with a contact pin. The current was thus actually transported exclusively via the carbon collector, which showed that carbon collectors can replace metallic collectors. The surface capacities achieved at 12.2 mAh/cm² are about four times as high as in the case of lithium ion or lithium-sulfur cells produced via paste processes. The sulfur exploitation was 56%.

Figure 3:
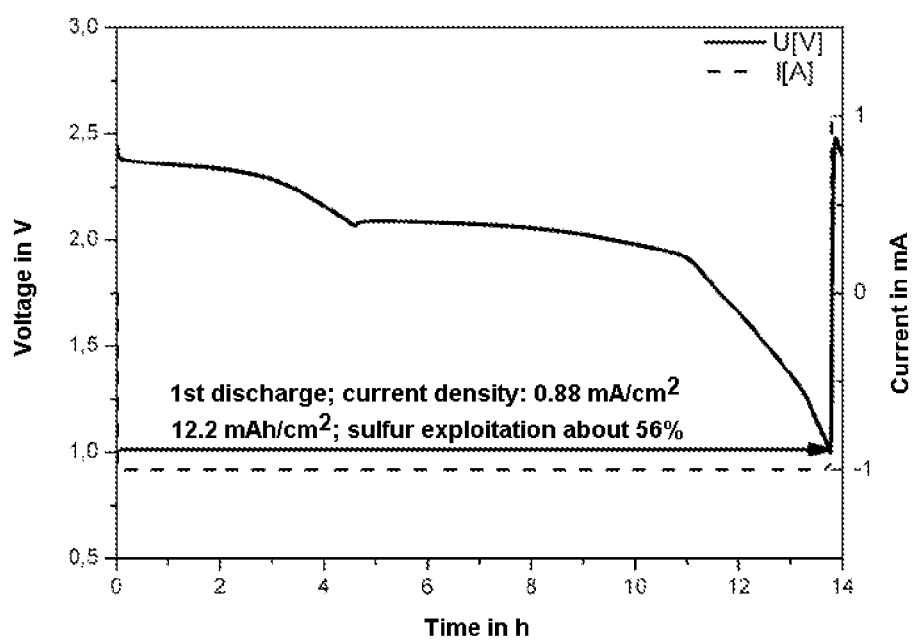
FIG. 3 illustrates a plot showing voltage and current as a function of time.

FIG. 3 shows voltage and current as a function of time.

The invention claimed is:

1. A cathode unit for an alkali metal-sulfur battery, comprising:
    a cathode collector comprising a carbon substrate, wherein the carbon substrate comprises a braid or network of carbon nanotubes, and
    an electrochemically active component which is selected from sulfur and an alkali metal sulfide and is in electrically conductive contact with the carbon substrate.

2. The cathode unit as claimed in claim 1, wherein the carbon substrate is configured as a flat structure having a surface conductivity of at least 0.01 S.

3. The cathode unit as claimed in claim 1, wherein the carbon substrate has a carbon content of at least 70% by weight.

4. The cathode unit as claimed in claim 1, wherein the carbon substrate is a woven or nonwoven textile fabric, a woven carbon fiber fabric, a carbon gas diffusion layer or combinations thereof.

5. The cathode unit as claimed in claim 1, wherein a substrate layer is applied to the carbon substrate, the substrate layer being a catalyst layer or polymer layer.

6. The cathode unit as claimed in claim 1, wherein the cathode collector does not comprise a metallic substrate.

7. The cathode unit as claimed in claim 1, wherein the alkali metal sulfide is selected from a lithium sulfide and a sodium sulfide.

8. The cathode unit as claimed in claim 1, additionally comprising an electrochemically inactive, electrically conductive carbon component which is in electrically conductive contact with the carbon substrate, the electrochemically active component at least partly covering the surface of the electrochemically inactive, electrically conductive carbon component.

9. The cathode unit as claimed in claim 8, wherein the electrochemically inactive, electrically conductive carbon component is selected from carbon nanotubes, graphite, carbon black, graphene, porous carbons and mixtures thereof.

10. An alkali metal-sulfur battery comprising the cathode unit as claimed in claim 1.

11. A process for producing the cathode unit as claimed in claim 1, comprising:
    providing a cathode collector comprising a carbon substrate,
    adding an electrochemically active component selected from sulfur and an alkali metal sulfide, such that the electrochemically active component is in electrically conductive contact with the carbon substrate.

12. The process as claimed in claim 11, wherein an electrochemically inactive, electrically conductive carbon component is additionally added, such that the electrochemically inactive, electrically conductive carbon component is in electrically conductive contact with the carbon substrate, and wherein the electrochemically active component at least partly covers the surface of the electrochemically inactive, electrically conductive carbon component.

* * * * *